Patented Dec. 21, 1943

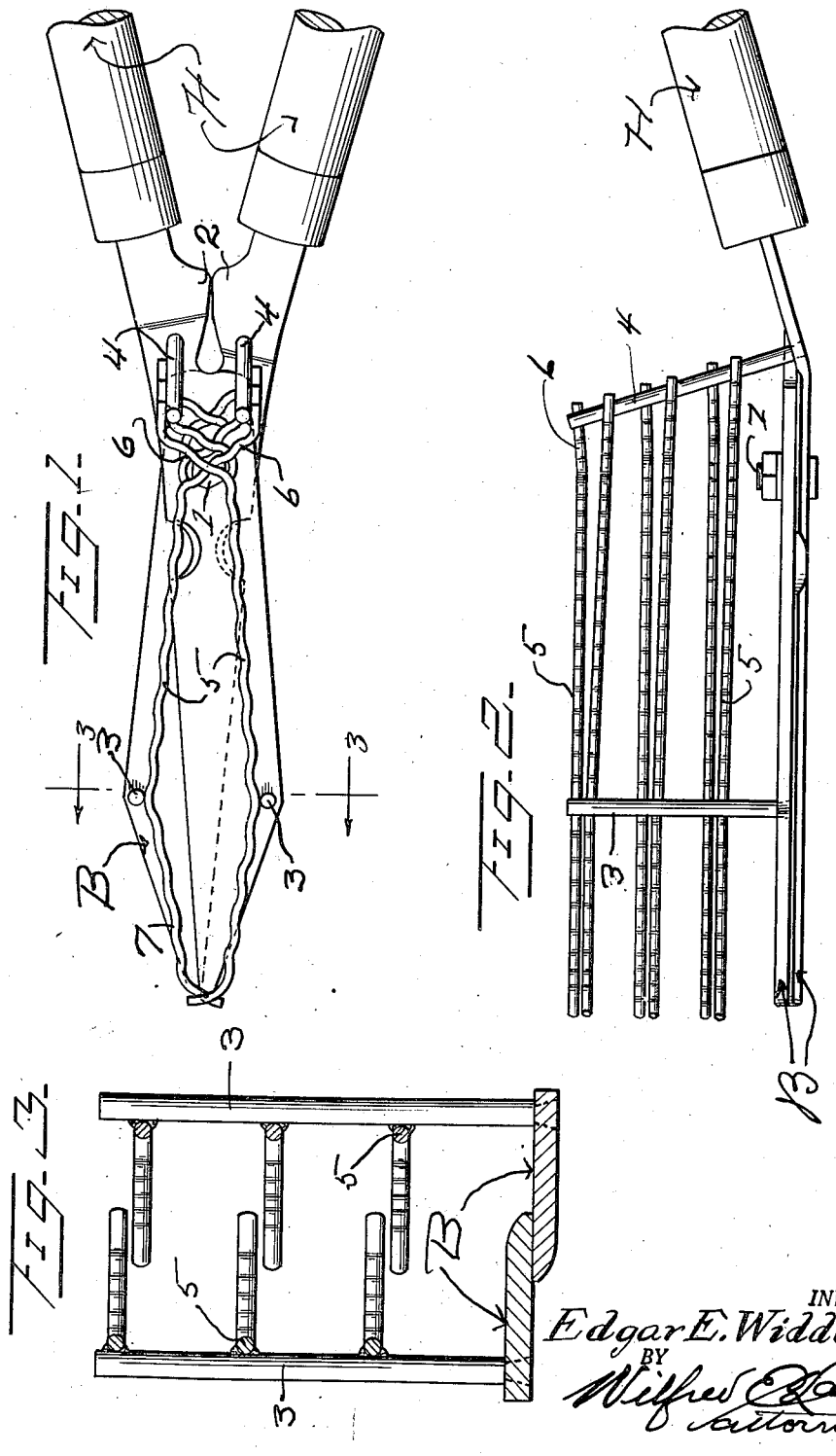

2,337,285

UNITED STATES PATENT OFFICE 2,337,285

HEDGE SHEARS

Edgar E. Widdowson, Bellefonte, Pa.

Application June 14, 1943, Serial No. 490,803

3 Claims. (Cl. 30—134)

This invention relates to hedge shears, and it is primarily an object of the invention to provide a cradle structure carried by the blades of the shears to provide means for holding the severed foliage immediately after cutting to facilitate the placing of the severed foliage in suitable receptacles or on the ground and also to provide means whereby severed foliage on the ground can be easily picked up.

Another object of the invention is to provide hedge shears having means carried by the blades of the shears to facilitate cleaning trimmings out of the hedge.

The invention consists in the details of construction and in the combination and arrangement of the several parts of my improved hedge shears whereby certain important advantages are attained, as will be hereinafter more fully set forth.

In order that my invention may be better understood, I will now proceed to describe the same with reference to the accompanying drawing, wherein:

Figure 1 is a view in top plan of hedge shears constructed in accordance with an embodiment of my invention, the operating handles being in fragment.

Figure 2 is a view in side elevation of the device as illustrated in Figure 1, and Figure 3 is an enlarged sectional view taken substantially on the line 3—3 of Figure 1.

As disclosed in the accompanying drawing, B denotes the elongated blades of the type generally used in shears for trimming hedges and the like, said blades being in crossed relation and pivotally connected, as at 1, for swinging movement one relative to the other. The blades B rearwardly of the pivot 1 carry the usual operating handles H and said blades B between the pivot 1 and the inner ends of the handles H are provided with inwardly disposed lugs 2 for contact one with the other, whereby the inward relative swinging movement of the outer or working portions of the blades B is limited.

The outer major or working portions of the blades B are substantially flat and relatively broad and the outer extremity of each of the blades B at a desired point inwardly of its outer end is provided with an upstanding post 3 which may be welded or otherwise rigidly secured to the blade B. This post 3 in the present embodiment of the invention is closely adjacent to the outer longitudinal margin of the blade, although this location may be varied as the requirements of practice may prefer.

Each of the blades B at a point between the pivot 1 and the stop lug 2 is provided with a second upstanding post 4 welded or otherwise rigidly secured to the blade B.

Welded or otherwise secured to the posts 3 and 4 at spaced points therealong are the relatively heavy elongated members 5, herein disclosed as undulated and which preferably comprise heavy wire strands. The lower or innermost member or strand 5 is also spaced from the blade B.

The members or strands 5 have their portions immediately adjacent to the post 4 disposed, as at 6, on an angle of approximately 45 degrees with respect to the longitudinal axis of the blade B, while the opposite or outer end portions of the members or strands 5 are inwardly disposed, as at 7, on a slight curvature, with the outer ends of said members or strands 5 terminating at a point closely adjacent to the outer end of the blade B and in close proximity to the cutting edge $a$ thereof. It is also to be noted that these members or strands 5 are successively of slightly increased length, with the shortest member or strand 5 adjacent to the blade B.

In the assembly of the shears, the portions 6 of the members or strands 5 carried by one blade B cross the corresponding portions 6 of the members or strands 5 carried by the second blade B, whereby the cradle or basket as afforded by the members or strands 5 is closed at all times between the fully opened and fully closed positions of the blades B.

With the shears as herein embodied provided with the basket or cradle, the foliage cut during the trimming of a hedge or other plants will be effectively held by the basket or cradle when the blades B are in closed relation so that such trimmings can be readily deposited in a can or other receptacle or upon the ground upon opening movement of the blades B. It is also believed to be readily apparent that the cradle or basket, as herein disclosed, affords effective means to allow trimmings or cut foliage lying on the ground to be easily and conveniently picked up.

While I have hereinbefore particularly referred to the invention as hedge shears, it is believed to be obvious that the shears as herein disclosed can be employed to advantage in the trimming of plants of various kinds.

From the foregoing description it is thought to be obvious that a hedge shears constructed in accordance with my invention is particularly well adapted for use by reason of the convenience and facility with which it may be assembled and operated.

What is claimed is:

1. In combination with the cutting blades of shears, outstanding posts carried by said shears adjacent the opposite ends thereof, and elongated members carried by the posts on each blade at points spaced along said posts, the members of one blade coacting with the members of the second blade to provide a basket.

2. In combination with the cutting blades of shears, outstanding posts carried by said shears adjacent the opposite ends thereof, and elongated members carried by the posts on each blade at points spaced along said posts, the members of one blade coacting with the members of the second blade to provide a basket, the inner portions of the members of one blade being in crossed relation with respect to the inner portions of the members of the second blade.

3. The combination with shears having crossed blades and means for pivotally connecting the crossed portions of the blades, posts carried by the opposite end portions of the blades, certain of said posts being positioned rearwardly of the pivotal connection between the blades, and elongated members connecting the posts carried by each blade, the extremities of the members adjacent the inner post being disposed on angles of substantially 90 degrees, the angular portions of the members of one blade being in crossed relation with the corresponding angular portions of the members of the second blade.

EDGAR E. WIDDOWSON.